(12) United States Patent
Duvall et al.

(10) Patent No.: US 11,059,699 B2
(45) Date of Patent: Jul. 13, 2021

(54) ELEVATOR SHEAVE ASSEMBLY

(71) Applicant: thyssenkrupp Elevator innovation and Operations GmbH, Essen (DE)

(72) Inventors: Jeffrey Duvall, Woodstock, GA (US); William Delk, Olive Branch, MS (US); Justin Morse, Memphis, TN (US)

(73) Assignee: TK Elevator Innovation and Operations GmbH, Essen (DE)

( * ) Notice: Subject to any disclaimer, the term of this patent is extended or adjusted under 35 U.S.C. 154(b) by 648 days.

(21) Appl. No.: 15/908,251

(22) Filed: Feb. 28, 2018

(65) Prior Publication Data
US 2019/0263631 A1 Aug. 29, 2019

(51) Int. Cl.
*B66B 15/04* (2006.01)
*F16H 55/50* (2006.01)
*B66D 3/08* (2006.01)

(52) U.S. Cl.
CPC ............ *B66B 15/04* (2013.01); *B66D 3/08* (2013.01); *F16H 55/50* (2013.01); *B66D 2700/028* (2013.01)

(58) Field of Classification Search
CPC .................................. B66B 15/04; B66D 3/08
See application file for complete search history.

(56) References Cited

U.S. PATENT DOCUMENTS

| 3,332,665 | A | 7/1967 | Bruns | |
|---|---|---|---|---|
| 6,405,833 | B1* | 6/2002 | Baranda | B66D 3/08 |
| | | | | 187/251 |
| 7,377,366 | B2* | 5/2008 | Det | B66B 7/027 |
| | | | | 187/250 |
| 10,046,949 | B2* | 8/2018 | Moser | B66B 15/02 |
| 10,246,303 | B2* | 4/2019 | Lampinen | B66B 9/00 |
| 10,556,777 | B2* | 2/2020 | Salmi | F16H 57/0471 |
| 2006/0070822 | A1 | 4/2006 | Osada et al. | |

* cited by examiner

*Primary Examiner* — Diem M Tran
(74) *Attorney, Agent, or Firm* — The Webb Law Firm

(57) ABSTRACT

An elevator sheave assembly with independently rotating sheaves includes a shaft having a longitudinal axis and a plurality of sheave subassemblies independently rotatable about the longitudinal axis of the shaft. Each of the plurality of sheave subassemblies includes a sheave having a running surface configured for frictional tractive engagement with a tension member, and at least one bearing rotatably connecting the sheave to the shaft. The elevator sheave assembly further includes a bearing spacer arranged between adjacent sheave subassemblies of the plurality of sheave subassemblies on the shaft to isolate rotation of the adjacent sheave subassemblies relative to one another. Each of the plurality of sheave subassemblies is independently rotatable such that the tension member associated with each of the plurality of sheave subassemblies operates on its own independently rotating sheave.

18 Claims, 8 Drawing Sheets

ELEVATOR SHEAVE ASSEMBLY

BACKGROUND

Field of the Invention

The present invention is generally directed to a sheave and bearing assembly for elevator tension members. More particularly, the present invention is directed to an elevator sheave assembly for permitting independent rotation of a plurality of elevator tension members.

Description of Related Art

Elevators for vertically transporting people and goods are an integral part of modern residential and commercial buildings. A typical elevator system includes one or more elevator cars raised and lowered by a hoist system. The hoist system typically includes both driven and idler sheave assemblies over which one or more tension members attached to the elevator car are driven. The elevator car is raised or lowered due to traction between the tension members and drive sheaves. A variety of tension member types, including wire rope, V-belts, flat belts, and chains, may be used, with the sheave assemblies having corresponding running surfaces to transmit tractive force between the tension members and the sheave assemblies.

For a number of reasons, typical elevator systems include multiple tension members installed adjacent to one another. First, the load of the elevator car can be spread out across the multiple tension members, thereby reducing the necessary size of the tension members. Smaller tension members are generally easier for technicians to work with and have smaller bend radii. Second, multiple tension members provide a failsafe measure to prevent the elevator car from freefalling if one of the tension members fails.

However, the use of multiple tension members complicates hoist systems, as the sheave assemblies must have multiple running surfaces to accommodate each of the tension members. Additionally, the tension members must be independently calibrated so that each tension member travels the same distance when raising and lowering the elevator car. However, due to manufacturing and assembling tolerances accumulated throughout the elevator system, it may not be possible to precisely calibrate each of the tension members to travel exactly the same distance throughout the range of motion of the elevator car. In such circumstances, the tension members are inclined to travel at slightly different rates over their respective running surfaces of the elevator sheave assemblies. This arrangement creates a problem in that typical elevator sheaves are manufactured as a unitary structure such that running surfaces for the respective tension members are integral with each other and are incapable of independently rotating speeds. As such, the tendency of the tension members to move at slightly different speeds from each other cannot be realized, resulting in unequal tensions between the tension members and/or slippage over the running surfaces. Unequal tensions between the tension members may be difficult or impossible to quantify and can significantly reduce the life of the tension members or even result in unexpected structural failure.

The above-described unitary sheave design typical of present elevator systems has numerous other deficiencies. First, the unitary design complicates installation and service of the hoist system when adjustment of an individual tension member is required. Because the sheave assembly is rotatable only as a unit, it is impossible to rotate the running surface corresponding to a single tension member. This limitation can make it extremely difficult to set the initial tension of the tension members or to replace less than the full complement of tension members.

Second, the unitary sheave design is specific to each elevator system based on the number of tension members used. Thus, a sheave for an elevator system having three tension members is not interchangeable with a sheave for an elevator system having four tension members. As a result, several sheave configurations must be manufactured and kept on hand as replacement parts.

Third, the length of the unitary sheave design can result in high shear and bending stresses toward the middle of the sheave, especially when bearings are only used at the outside edges of the sheave.

Various sheave assemblies which are known in the art. U.S. Pat. No. 3,332,665 to Bruns ("Bruns") is directed to an elevator sheave including a hub to which one sheave is fixedly mounted and two other sheaves are rotatably attached. However, the hub of Bruns has a predetermined length based on the number of tension members used and therefore must be manufactured for a specific hoist system.

U.S. Patent Application Publication No. 2006/0070822 to Osada et al. ("Osada") is directed to a sheave for an elevator using wire ropes. In one embodiment, multiple sheaves are used for a multiple tension member hoist arrangement.

SUMMARY

In view of the foregoing, there exists a need for an elevator sheave assembly which permits independent rotation of the corresponding tension members. Further, there exists a need for an elevator sheave assembly which utilizes modular sheaves such that the sheaves can be individually replaced, and such that a single sheave design is useable regardless of the number of tension members in the hoist assembly.

Embodiments of the present invention are directed to an elevator sheave assembly with independently rotating sheaves includes a shaft having a longitudinal axis and a plurality of sheave subassemblies independently rotatable about the longitudinal axis of the shaft. Each of the plurality of sheave subassemblies includes a sheave having a running surface configured for frictional tractive engagement with a tension member, and at least one bearing rotatably connecting the sheave to the shaft. The elevator sheave assembly further includes a bearing spacer arranged between adjacent sheave subassemblies of the plurality of sheave subassemblies on the shaft to isolate rotation of the adjacent sheave subassemblies relative to one another. Each of the plurality of sheave subassemblies is independently rotatable such that the tension member associated with each of the plurality of sheave subassemblies operates on its own independently rotating sheave.

In some embodiments, each of the plurality of sheave subassemblies is independently rotatable about the shaft at a different speed than the other sheave subassemblies of the plurality of sheave subassemblies.

In some embodiments, an outer face of each bearing of each sheave subassembly is aligned flush with an outer face of the sheave of that sheave subassembly.

In some embodiments, the shaft defines a groove at an end of the shaft and further includes a retaining clip disposed in the groove for preventing lateral movement of the plurality of sheave subassemblies on the shaft.

In some embodiments, the shaft includes a step at which the diameter of the shaft increases, the step preventing lateral movement of the plurality of sheave subassemblies on the shaft.

In some embodiments, the sheave of each of the plurality of sheave subassemblies defines a bore extending longitudinally through the sheave and housing the at least one bearing.

In some embodiments, the bore of each sheave includes at least one shoulder configured to receive the at least one bearing.

In some embodiments, the at least one bearing of each of the sheave subassemblies is at least one roller bearing or ball bearing having an inner race connected to the shaft and an outer race connected to the sheave.

In some embodiments, the elevator sheave assembly further includes a bearing spacer arranged between adjacent sheave subassemblies of the plurality of sheave subassemblies on the shaft to isolate rotation of the adjacent sheave subassemblies relative to one another, and wherein the bearing spacer abuts and separates adjacent inner races of the least one bearing of the adjacent sheave subassemblies.

In some embodiments, the at least one bearing of each of the sheave subassemblies is a bushing.

In some embodiments, the elevator sheave assembly further includes a bearing spacer arranged between adjacent sheave subassemblies of the plurality of sheave subassemblies on the shaft to isolate rotation of the adjacent sheave subassemblies relative to one another, and wherein the bearing spacer abuts and separates adjacent bushings of the adjacent sheave subassemblies.

In some embodiments, at least one of the plurality of sheave subassemblies is removable from the shaft without removal of the remaining plurality of sheave subassemblies.

In some embodiments, the running surface of the sheave of each of the plurality of sheave subassemblies is crowned for frictional tractive engagement with a flat belt tension member.

In some embodiments, the running surface of the sheave of each of the plurality of sheave subassemblies includes one or more V-shaped grooves for frictional tractive engagement with a V-belt tension member.

In some embodiments, the running surface of the sheave of each of the plurality of sheave subassemblies is concave for frictional tractive engagement with a wire rope tension member.

Further embodiments of the present invention are directed to an elevator system including an elevator shaft having a support frame, an elevator car movable along a vertical travel path defined by the elevator shaft, a motor arrangement including at least one drive sheave rotatable via the motor arrangement, and at least one elevator sheave assembly connected one of the elevator car and the support frame. The at least one elevator sheave assembly includes a shaft having a longitudinal axis, and a plurality of sheave subassemblies independently rotatable about the longitudinal axis of the shaft. Each of the plurality of sheave subassemblies includes a sheave having a running surface and at least one bearing rotatably connecting the sheave to the shaft. Each elevator sheave assembly further includes a bearing spacer arranged between adjacent sheave subassemblies of the plurality of sheave subassemblies on the shaft to isolate rotation of the adjacent sheave subassemblies relative to one another. Each of the plurality of sheave subassemblies is independently rotatable relative to the other sheave subassemblies. The elevator system further includes a plurality of tension members each in frictional tractive engagement with at least one drive sheave of the motor arrangement and the sheave of one of the plurality of sheave subassemblies of the elevator sheave assembly. The at least one elevator sheave assembly permits each tension member engaged with the at least one elevator sheave assembly to move at a different speed relative to the other tension members associated with the at least one elevator sheave assembly.

In some embodiments, wherein an outer face of each bearing of each sheave subassembly of the at least one elevator sheave assembly is aligned flush with an outer face of the sheave of that sheave subassembly.

In some embodiments, the at least one bearing of each of the sheave subassemblies of the at least one elevator sheave assembly is at least one roller bearing or ball bearing having an inner race connected to the shaft and an outer race connected to the sheave.

In some embodiments, the at least one bearing of each of the sheave subassemblies of the at least one elevator sheave assembly is a bushing.

In some embodiments, at least one of the plurality of sheave subassemblies of the elevator sheave assembly is removable from the shaft without removal of the remaining plurality of sheave subassemblies.

Further embodiments of the present invention will now be described in the following numbered clauses:

Clause 1. An elevator sheave assembly with independently rotating sheaves, comprising: a shaft having a longitudinal axis; a plurality of sheave subassemblies independently rotatable about the longitudinal axis of the shaft, each of the plurality of sheave subassemblies comprising: a sheave having a running surface configured for frictional tractive engagement with a tension member; and at least one bearing rotatably connecting the sheave to the shaft; and a bearing spacer arranged between adjacent sheave subassemblies of the plurality of sheave subassemblies on the shaft to isolate rotation of the adjacent sheave subassemblies relative to one another, wherein each of the plurality of sheave subassemblies is independently rotatable such that the tension member associated with each of the plurality of sheave subassemblies operates on its own independently rotating sheave.

Clause 2. The elevator sheave assembly of clause 1, wherein each of the plurality of sheave subassemblies is independently rotatable about the shaft at a different speed than the other sheave subassemblies of the plurality of sheave subassemblies.

Clause 3. The elevator sheave assembly of clause 1 or 2, wherein an outer face of each bearing of each sheave subassembly is aligned flush with an outer face of the sheave of that sheave subassembly.

Clause 4. The elevator sheave assembly of any of clauses 1 to 3, wherein the shaft defines a groove at an end of the shaft and further comprising a retaining clip disposed in the groove for preventing lateral movement of the plurality of sheave subassemblies on the shaft.

Clause 5. The elevator sheave assembly of any of clauses 1 to 4, wherein the shaft comprises a step at which the diameter of the shaft increases, the step preventing lateral movement of the plurality of sheave subassemblies on the shaft.

Clause 6. The elevator sheave assembly of any of clauses 1 to 5, wherein the sheave of each of the plurality of sheave subassemblies defines a bore extending longitudinally through the sheave and housing the at least one bearing.

Clause 7 The elevator sheave assembly of any of clauses 1 to 6, wherein the bore of each sheave comprises at least one shoulder configured to receive the at least one bearing.

Clause 8. The elevator sheave assembly of any of clauses 1 to 7, wherein the at least one bearing of each of the sheave subassemblies is at least one roller bearing or ball bearing having an inner race connected to the shaft and an outer race connected to the sheave.

Clause 9. The elevator sheave assembly of any of clauses 1 to 8, wherein the bearing spacer abuts and separates adjacent inner races of the least one bearing of the adjacent sheave subassemblies.

Clause 10. The elevator sheave assembly of any of clauses 1 to 9, wherein the at least one bearing of each of the sheave subassemblies is a bushing.

Clause 11. The elevator sheave assembly of any of clauses 1 to 10, wherein the bearing spacer abuts and separates adjacent bushings of the adjacent sheave subassemblies.

Clause 12. The elevator sheave assembly of any of clauses 1 to 11, wherein at least one of the plurality of sheave subassemblies is removable from the shaft without removal of the remaining plurality of sheave subassemblies.

Clause 13. The elevator sheave assembly of any of clauses 1 to 12, wherein the running surface of the sheave of each of the plurality of sheave subassemblies is crowned for frictional tractive engagement with a flat belt tension member.

Clause 14. The elevator sheave assembly of any of clauses 1 to 13, wherein the running surface of the sheave of each of the plurality of sheave subassemblies includes one or more V-shaped grooves for frictional tractive engagement with a V-belt tension member.

Clause 15. The elevator sheave assembly of any of clauses 1 to 14, wherein the running surface of the sheave of each of the plurality of sheave subassemblies is concave for frictional tractive engagement with a wire rope tension member.

Clause 16. An elevator system, comprising: an elevator shaft having a support frame, an elevator car movable along a vertical travel path defined by the elevator shaft; a motor arrangement comprising at least one drive sheave rotatable via the motor arrangement; at least one elevator sheave assembly connected one of the elevator car and the support frame, the at least one elevator sheave assembly comprising: a shaft having a longitudinal axis; and a plurality of sheave subassemblies independently rotatable about the longitudinal axis of the shaft, each of the plurality of sheave subassemblies comprising: a sheave having a running surface; and at least one bearing rotatably connecting the sheave to the shaft; and a bearing spacer arranged between adjacent sheave subassemblies of the plurality of sheave subassemblies on the shaft to isolate rotation of the adjacent sheave subassemblies relative to one another, wherein each of the plurality of sheave subassemblies is independently rotatable relative to the other sheave subassemblies; and a plurality of tension members each in frictional tractive engagement with at least one drive sheave of the motor arrangement and the sheave of one of the plurality of sheave subassemblies of the elevator sheave assembly, wherein the at least one elevator sheave assembly permits each tension member engaged with the at least one elevator sheave assembly to move at a different speed relative to the other tension members associated with the at least one elevator sheave assembly.

Clause 17. The elevator system of clause 16, wherein an outer face of each bearing of each sheave subassembly of the at least one elevator sheave assembly is aligned flush with an outer face of the sheave of that sheave subassembly Clause 18. The elevator system of clause 16 or 17, wherein the at least one bearing of each of the sheave subassemblies of the at least one elevator sheave assembly is at least one roller bearing or ball bearing having an inner race connected to the shaft and an outer race connected to the sheave.

Clause 19. The elevator system of any of clauses 16 to 18, wherein the at least one bearing of each of the sheave subassemblies of the at least one elevator sheave assembly is a bushing.

Clause 20. The elevator system of any of clauses 16 to 19, wherein at least one of the plurality of sheave subassemblies of the elevator sheave assembly is removable from the shaft without removal of the remaining plurality of sheave subassemblies.

These and other features and characteristics of elevator sheave assemblies, as well as the methods of operation and functions of the related elements of the support apparatus, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and claims, the singular forms of "a", "an", and "the" include plural referents unless the context clearly dictates otherwise.

DETAILED DESCRIPTION

Figure 1:
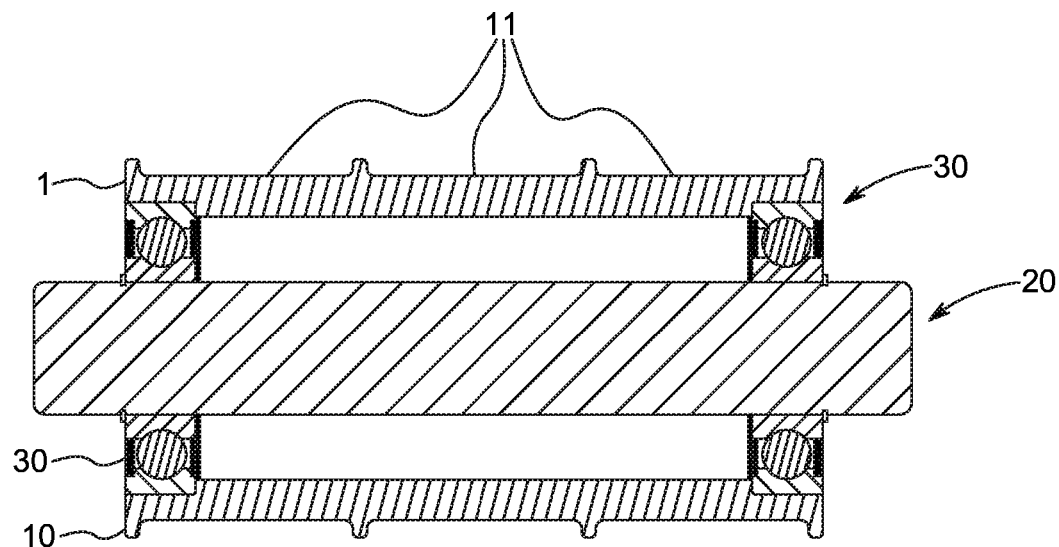
FIG. 1 is a cross-sectional view of a prior art sheave assembly.

For purposes of the description hereinafter, the terms "upper", "lower", "right", "left", "vertical", "horizontal", "top", "bottom", "lateral", "longitudinal", and derivatives thereof, shall relate to the disclosed apparatus as it is oriented in the figures. However, it is to be understood that the apparatus of the present invention may assume alternative variations and step sequences, except where expressly specified to the contrary. It is also to be understood that the specific systems and processes illustrated in the attached drawings and described in the following specification are simply exemplary examples of the apparatus disclosed herein. Hence, specific dimensions and other physical characteristics related to the examples disclosed herein are not to be considered as limiting.

As used herein, the terms "sheave" and "pulley" are used interchangeably to describe a wheel for tractive connection to a tension member of any type. It is to be understood that a "pulley" is encompassed by the recitation of a "sheave", and vice versa, unless explicitly stated to the contrary.

Referring to the drawings in which like reference numerals refer to like parts throughout the several views thereof, the present invention is generally directed to a sheave and bearing assembly for elevator tension members. More particularly, the present invention is directed to an elevator sheave assembly for a plurality of elevator tension members. It is to be understood, however, that the sheave and bearing assembly may be used in many different applications in which multiple tension members are utilized in traction with sheaves.

FIG. 1 illustrates a sheave assembly 1 known in the art including a sheave 10 having running surfaces 11 for three tension members. The sheave 10 is rotatable about a shaft 20 via roller bearings 30 located at the outer edges of the sheave 10. As is evident from the unitary structure of the sheave 10, the running surfaces 11 are not independently rotatable.

With reference to FIGS. 2-7, an elevator sheave assembly 100 for a plurality of elevator tension members 200 (shown in FIGS. 4 and 5) includes a plurality of sheaves 110 each having a running surface 111 for frictional tractive engagement with one of the tension members 200. Each sheave 110 includes a bore 120 for receiving a shaft 300. The sheaves 110 are arranged adjacently to the shaft 300 such that the sheaves 110 share an axis of rotation coincident with a longitudinal axis of the shaft 300. Each of the sheaves 110 is independently rotatable with respect to the shaft 300. While the accompanying figures show three sheaves 110 and tension members 200, it is to be understood that the elevator sheave assembly 100 may include any number of sheaves 110 and tension members 200 as required by the specific elevator system in which the elevator sheave assembly 100 is used. Additionally, each sheave 110 may support multiple tension members 200.

Figure 8:
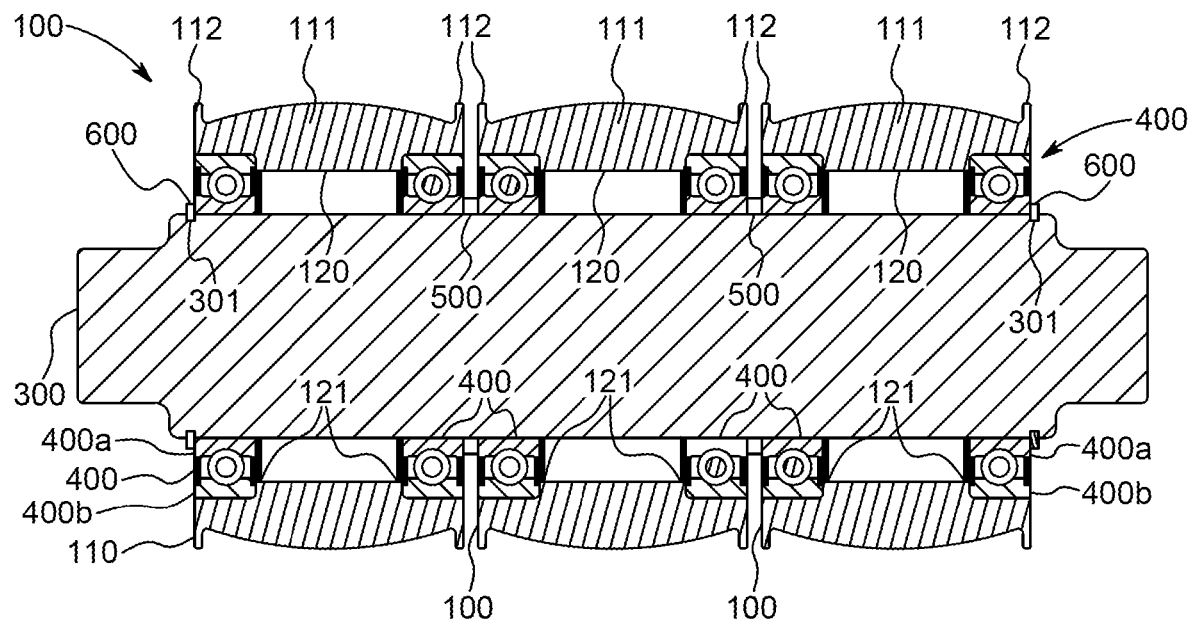
FIG. 8 is a cross-sectional view of an elevator sheave assembly according to an embodiment of the present invention.
Figure 9:
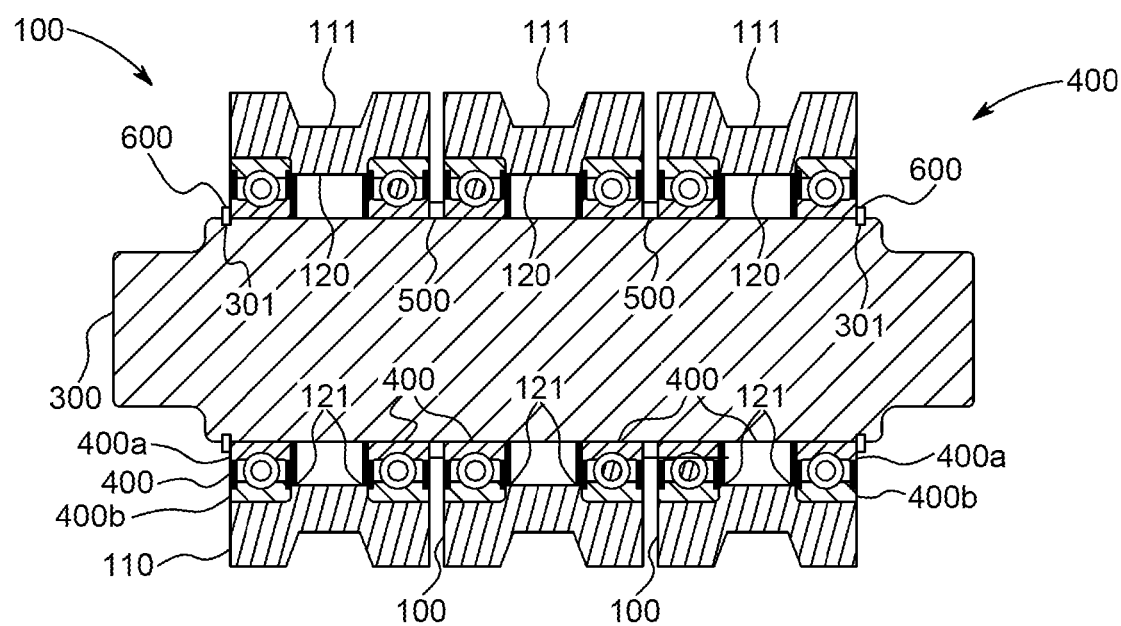
FIG. 9 is a cross-sectional view of an elevator sheave assembly according to an embodiment of the present invention.
Figure 10:
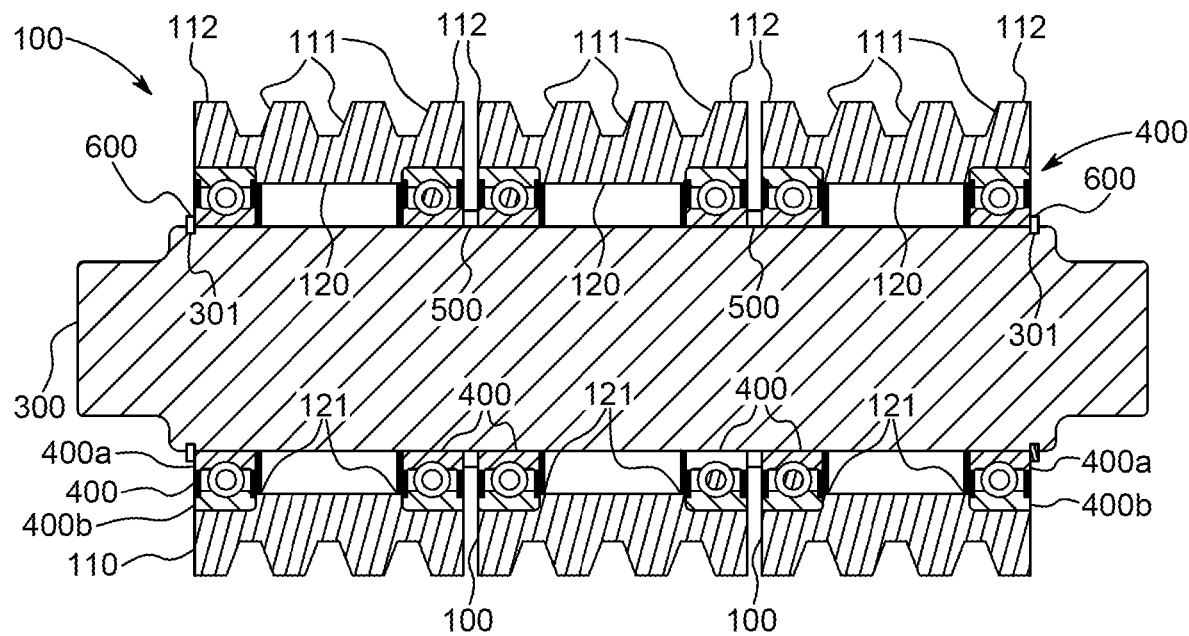
FIG. 10 is a cross-sectional view of an elevator sheave assembly according to an embodiment of the present invention.
Figure 11:
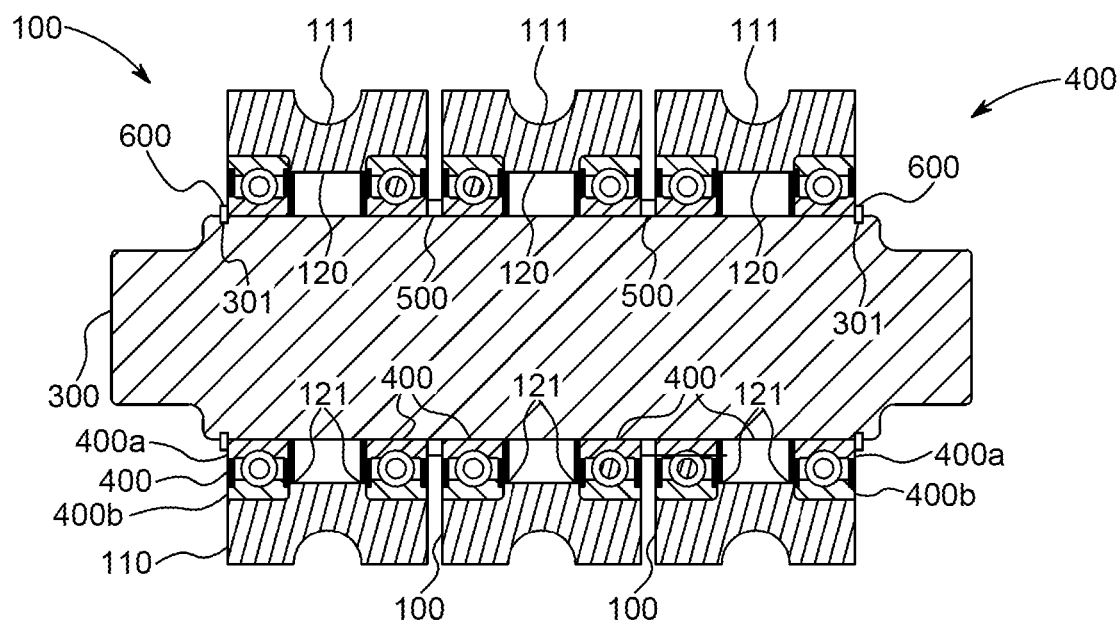
FIG. 11 is a cross-sectional view of an elevator sheave assembly according to an embodiment of the present invention.
Figure 12:
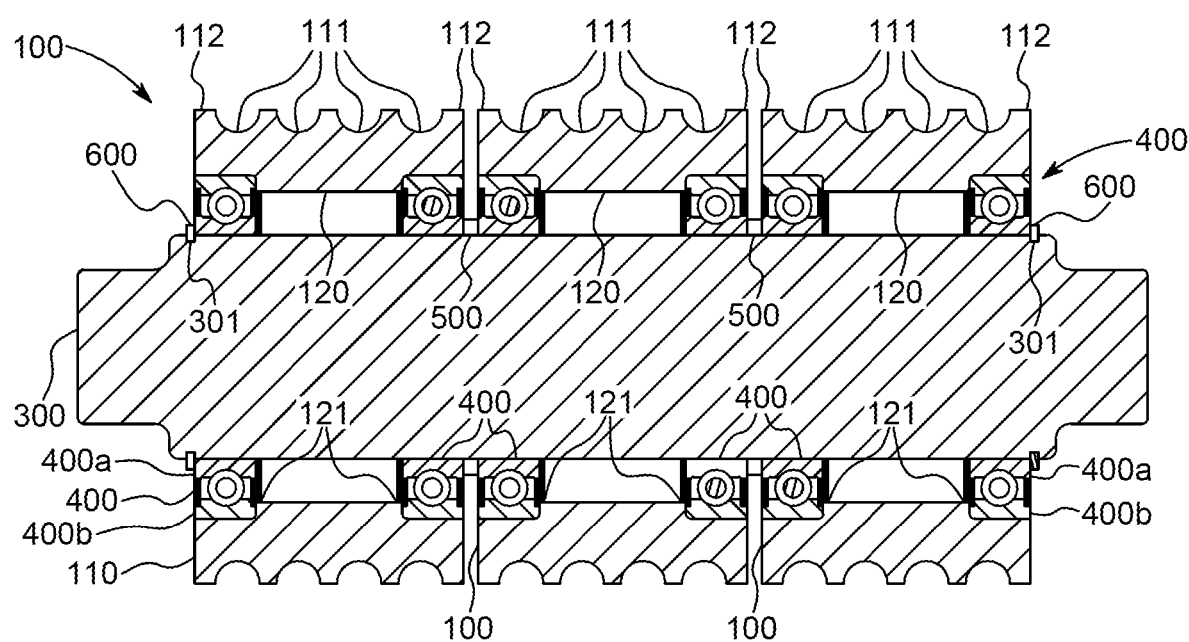
FIG. 12 is a cross-sectional view of an elevator sheave assembly according to an embodiment of the present invention.

Each sheave 110 includes opposing end flanges 112 for retaining the tension members 200 on the running surface 111. The running surfaces 111 are configured for the specific type of tension member 200 used with the sheaves 110. In the embodiment shown in FIGS. 2-4, each running surface 111 is a flat groove for use with a flat belt tension member 200. The running surface 111 may be crowned, as shown in FIG. 8, to assist in tracking the flat belt tension member 200 in the center of the running surface 111. In the embodiments shown in FIGS. 5, 11, and 12, each running surface 111 is a concave round groove for use with a wire rope tension member 200. In the other embodiments, each running surface 111 may include one or more V-shaped grooves, as shown in FIGS. 9 and 10, for use with a V-belt or serpentine V-belt tension member 200. In other embodiments, each running surface 111 may include one or more circumferential grooves for locating the tension members 200 on the sheaves 110. In still other embodiments, each running surface 111 may include one or more axially grooves configured for receiving corresponding teeth on toothed or timing tension members 200.

Figure 2:
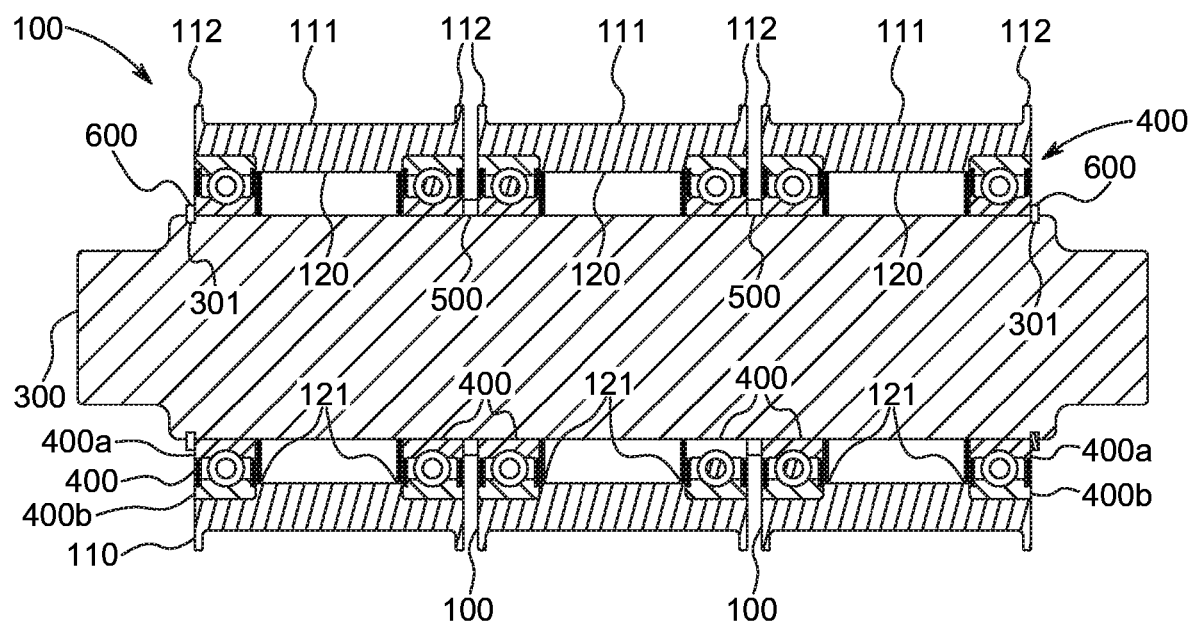
FIG. 2 is a cross-sectional view of an elevator sheave assembly according to an embodiment of the present invention.
Figure 3:
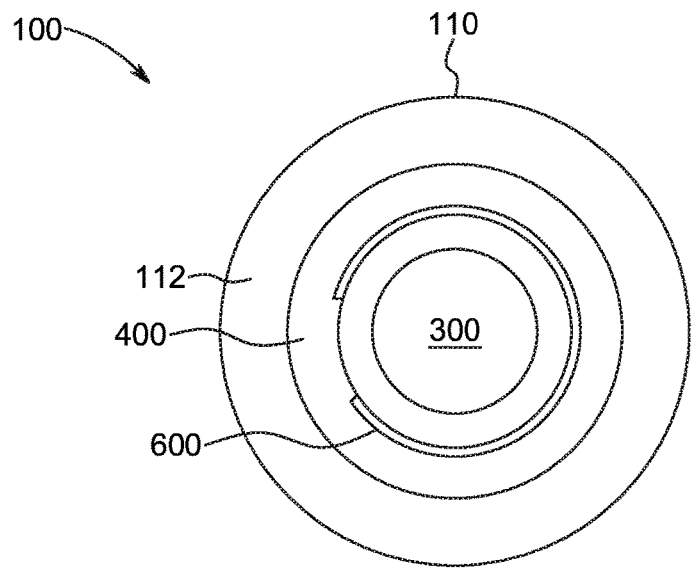
FIG. 3 is a side view of the elevator sheave assembly of FIG. 2.
Figure 4:
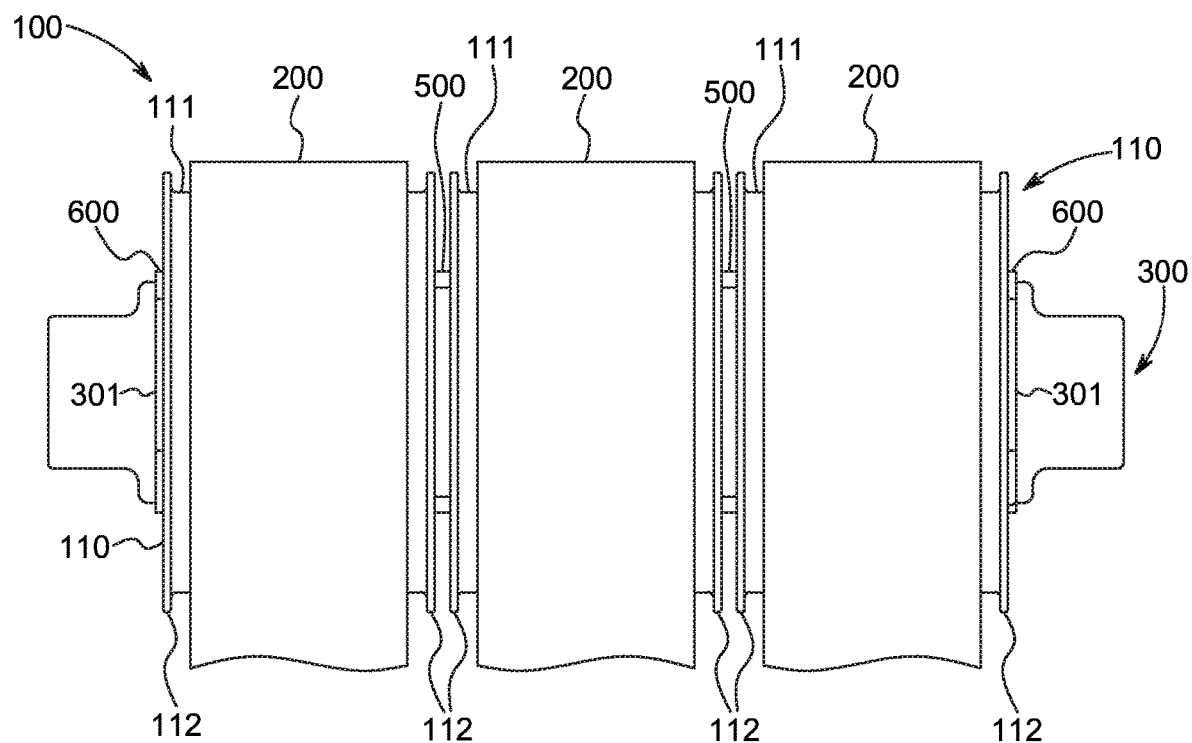
FIG. 4 is a front view of the elevator sheave assembly of FIG. 2 with a plurality of belt tension members.
Figure 5:
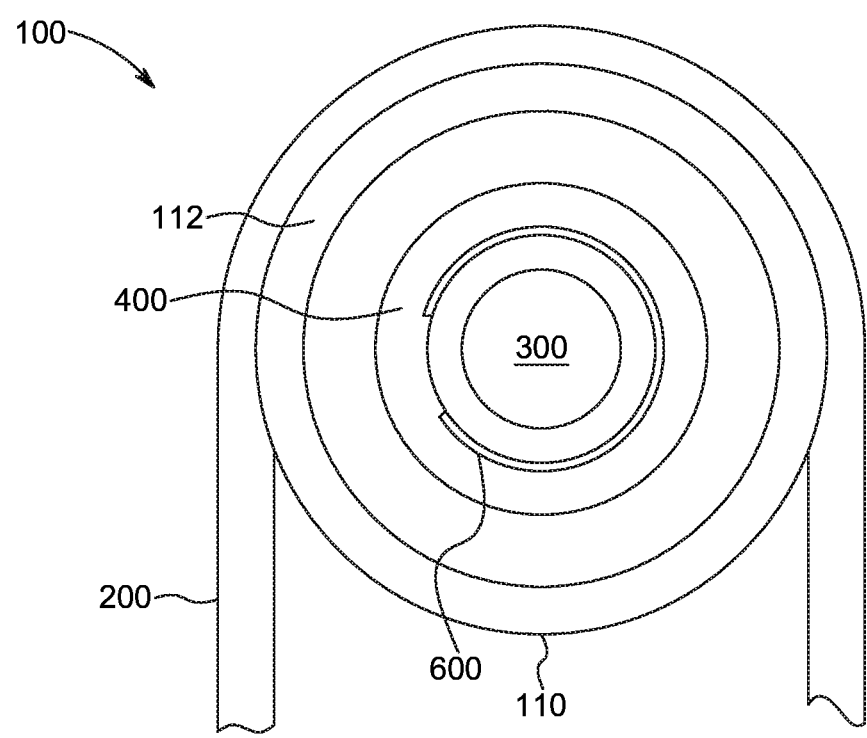
FIG. 5 is a side view of the elevator sheave assembly of FIG. 4 with a plurality of wire rope tension members.

With continued reference to FIGS. 2-5, each sheave 110 may have a shoulder 121 machined or otherwise formed into opposing ends of the bore 120, each shoulder 121 configured to receive a bearing 400 rotatably connecting the sheave 110 to the shaft 300. The bearings 400 may be roller bearings, ball bearings, needle bearings, bushings, or the like to permit rotation of the sheaves 110 relative to the shaft 300. In embodiments in which the bearings 400 are roller bearings or ball bearings, an inner race 400a of the bearing 400 may be fixedly connected to the shaft 300, and an outer race 400b of the bearing 400 may be fixedly connected to the sheave 110. The fixed connections between the bearing outer race 400b and the sheave 110 may be, for example, an interference fit between the bearing outer race 400b and the sheave 110. In embodiments in which the bearings 400 are bushings, the bearings 400 may be fixedly connected to the sheaves 110 via an interference fit, and the bearing 400 may freely slide over the shaft 300. As shown in FIG. 2, an outer face of each bearings 400 corresponding to each sheave 110 may be aligned flush with an outer face of the corresponding sheave 110.

A bearing spacer 500 may be disposed on the shaft 300 between the bearings 400 of adjacent sheaves 110 to index the sheaves 110 on the shaft 300 and to isolate rotation of adjacent sheaves 110 relative to each other. In embodiments of the elevator sheave assembly 100 in which the bearings 400 are roller bearings or ball bearings, the bearing spacers 500 may abut only the inner races 400a of adjacent bearings 400, which are stationary relative to the shaft 300, such that the movements of adjacent sheaves 110 are completely isolated from each other. In other embodiments, the bearing spacers 500 may radially extend from the shaft 300 such the bearing spacers 500 abut one or more of the inner races 400a, outer races 400b, and adjacent sheaves 110.

With reference to FIGS. 2-5, the sheaves 110 may be retained on the shaft 300 by retaining clips 600 that fit into corresponding grooves 301 in the shaft 300. The retaining clips 600 may provide a physical obstruction preventing lateral movement of the sheaves 110 and/or bearings 400 on the shaft 300. In other embodiments, the sheaves 110 may be retained on the shaft 300 by locking collars, clamps, or like elements. In addition, as shown in FIG. 7, one end of the shaft 300 may include a step 302 at which the diameter of the shaft 300 increases, thereby creating a physical obstruction for retaining the sheaves 110.

Figure 6:
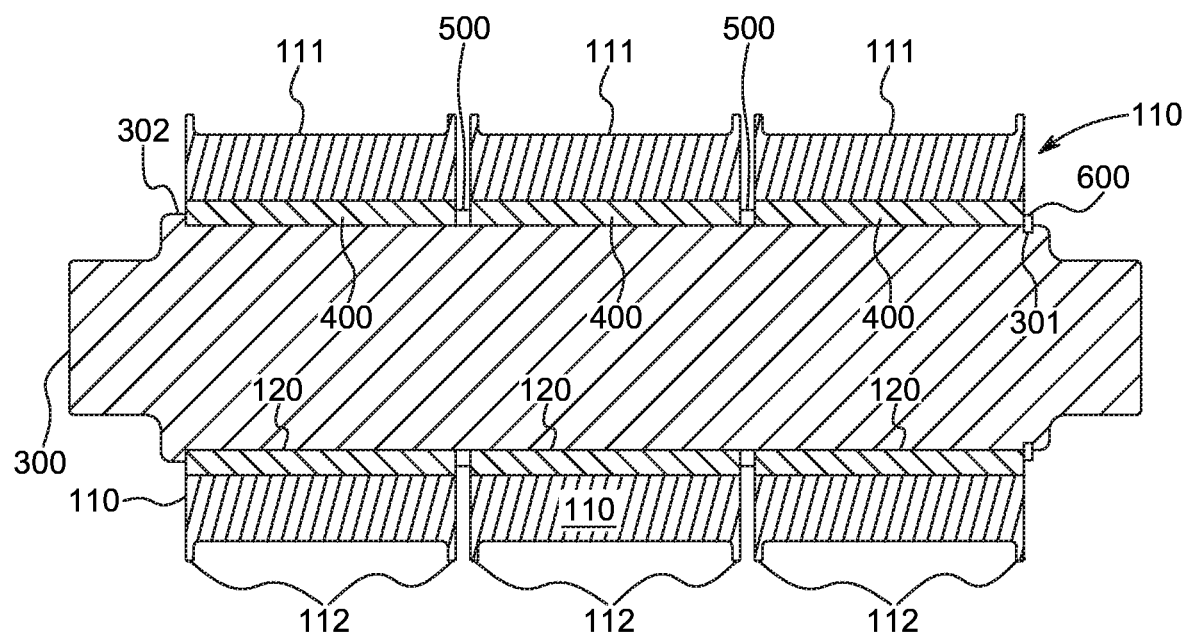
FIG. 6 is a front cross-sectional view of an elevator sheave assembly according to another embodiment of the present invention.

With reference to FIG. 6, other embodiments of the sheave 110 of the elevator sheave assembly 100 may lack the shoulders 121 and may instead include a bearing 400 extending at least part of the length of the bore 120. As with the previously described embodiments, the bearing 400 may be a roller bearing, ball bearing, bushing (as shown in FIG. 7), or the like to permit rotation of the sheaves 110 relative to the shaft 300.

In the embodiments described with respect to FIGS. 2-6, it may be appreciated that each sheave 110 is independently rotatable relative to the other sheaves 110. As such, each tension member 200 may be independently calibrated and/or serviced without affecting the other tension members 200. Further, the tension members 200 are permitted to travel at different speeds so that tension is equalized across all of the tension members 200. Therefore, life of the tension members 200 is extended, and the risk of failure due to asymmetric loading is substantially decreased. Further, each sheave 110 is also independently serviceable and replaceable. More particularly, each sheave 110 and its associated one or more bearings 400 form a sheave subassembly which may be removed from the elevator sheave assembly 100 as a modular unit. As such, failure of one sheave 110 or bearing 400 does not necessitate replacement of the entire elevator sheave assembly 100. Rather, only the sheave subassembly including the damaged or broken component needs to be replaced, without removal or replacement of the remaining sheave subassemblies. Additionally, any number of sheave subassemblies, including the sheave 110 and its associated one or more bearings 400, may be arranged on the shaft 300 as required by the number of tension members 200 in a given elevator application. Thus, only one sheave design is required regardless of the number of tension members 200 employed.

Figure 7:
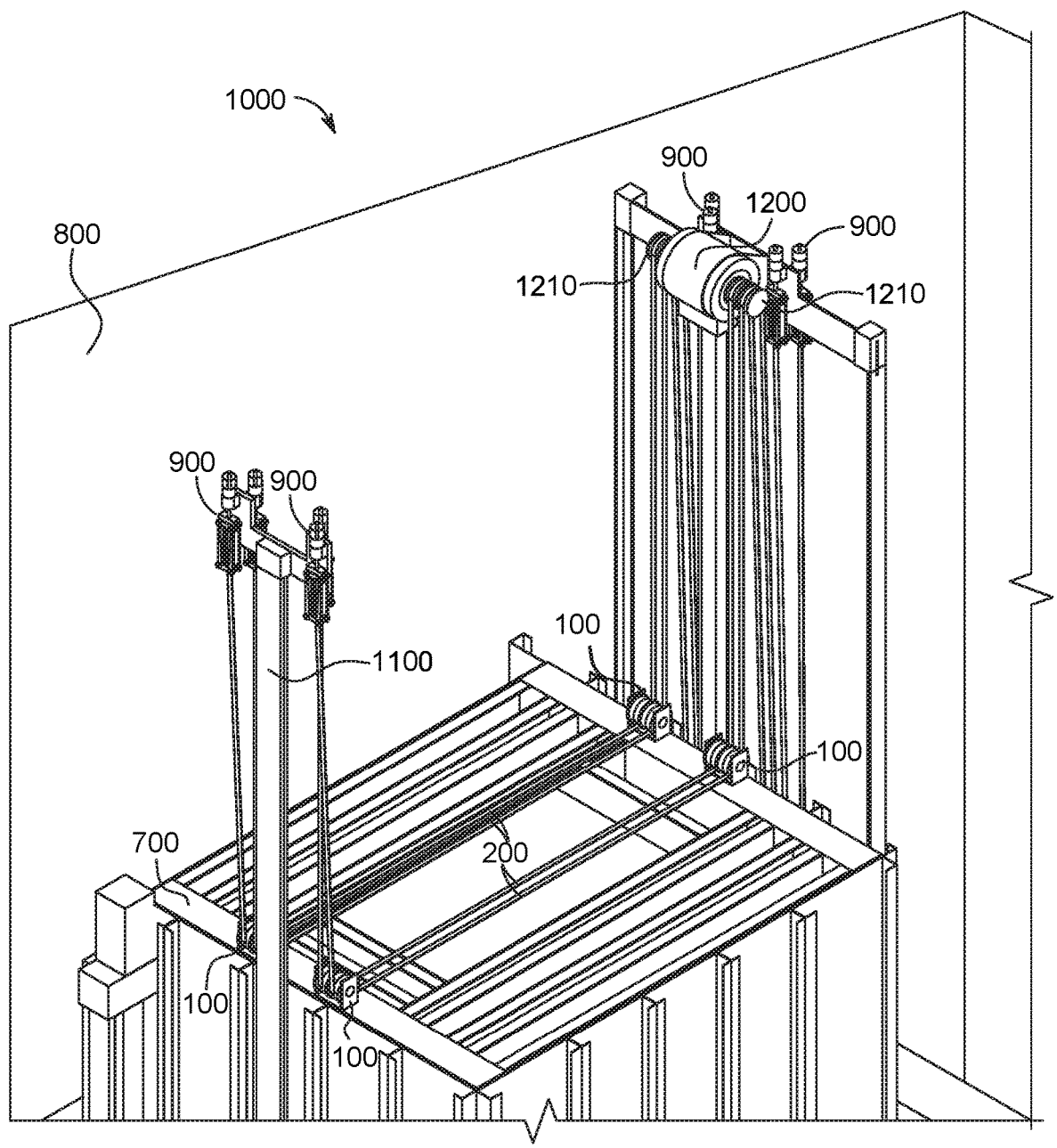
FIG. 7 is a perspective view of an elevator system incorporating the elevator sheave assembly according to embodiments of this disclosure.

Referring now to FIG. 7, other embodiments of the present invention are directed to an elevator system 1000 utilizing at least one of the elevator sheave assemblies 100 described with reference to FIGS. 1-6. The elevator system 1000 may include an elevator car 700 and counterweight (not shown) movable along a vertical travel path defined by an elevator shaft 800 using a plurality of tension members 200 that raise and/or lower the elevator car 700. In the embodiment shown in FIG. 7, the elevator system 1000 includes four tension members 200 configured to move the elevator car 700 and counterweight within the elevator shaft 800. Each end of each tension member 200 may be held in a separate end termination 900 affixed to a stationary or movable component of the elevator system 1000, such as a support frame 1100, the elevator car 700, or any other load supporting component of the elevator system 1000. The plurality of tension members 200 may be routed around any number of elevator sheave assemblies 100 to alter the direction of the tension force applied by the plurality of tension members 200 on the elevator car 700 and the counterweight. The elevator sheave assemblies 100 may be attached to any portion of the elevator system 1000 including the support frame 1100, the elevator car 700, and/or the counterweight to redirect the tension of the plurality of tension members 200 according the design of the elevator system 1000. The plurality of tension members 200 are further routed around drive sheaves 1210 rotatable by at least one motor arrangement 1200. The drive sheaves 1210 frictionally engage the plurality of tension member 200 between opposing ends of the tension members 200 such that rotation of the drive sheaves 1210 increases or decreases the length of the tension members 200 between a first end the of the tension members 200 and the drive arrangement 1200. Rotation of the drive sheaves 1210 thus causes the elevator car 700 to raise or lower depending on the direction of rotation of the drive sheaves 1210 and the arrangement of the counterweight, end terminations 900, and elevator sheave assemblies 100.

While several examples of an elevator sheave assembly for an elevator system are shown in the accompanying figures and described in detail hereinabove, other examples will be apparent to, and readily made by, those skilled in the art without departing from the scope and spirit of the invention. For example, it is to be understood that aspects of the various embodiments described hereinabove may be combined with aspects of other embodiments while still falling within the scope of the present invention. Accordingly, the foregoing description is intended to be illustrative rather than restrictive. The assembly of the present invention described hereinabove is defined by the appended claims, and all changes to the disclosed assembly that fall within the meaning and range of equivalency of the claims are to be embraced within their scope.

What is claimed is:

1. An elevator sheave assembly with independently rotating sheaves, comprising:
    a shaft having a longitudinal axis;
    a plurality of sheave subassemblies independently rotatable about the longitudinal axis of the shaft, each of the plurality of sheave subassemblies comprising:
        a sheave having a running surface configured for frictional tractive engagement with a tension member; and
        two bearings arranged at opposing outer faces of the sheave and spaced apart from one another for rotatably connecting the sheave to the shaft,
    a bearing spacer arranged between adjacent sheave subassemblies of the plurality of sheave subassemblies on the shaft to isolate rotation of the adjacent sheave subassemblies relative to one another,
    wherein each of the plurality of sheave subassemblies is independently rotatable such that the tension member associated with each of the plurality of sheave subassemblies operates on its own independently rotating sheave,
    wherein the sheave of each of the plurality of sheave subassemblies defines a bore extending longitudinally through the sheave and housing the two bearings,
    wherein the bore of each sheave comprises two shoulders, each shoulder configured to receive one of the bearings,
    wherein the two shoulders are recessed inward from the opposing outer faces of the sheave, and
    wherein the two shoulders are spaced apart from one another.

2. The elevator sheave assembly of claim 1, wherein each of the plurality of sheave subassemblies is independently rotatable about the shaft at a different speed than the other sheave subassemblies of the plurality of sheave subassemblies.

3. The elevator sheave assembly of claim 1, wherein an outer face of each of the two bearings of a first of the plurality of sheave subassemblies is aligned flush with an outer face of the sheave of the first sheave subassembly.

4. The elevator sheave assembly of claim 1, wherein the shaft defines a groove at an end of the shaft and further comprising a retaining clip disposed in the groove for preventing lateral movement of the plurality of sheave subassemblies on the shaft.

5. The elevator sheave assembly of claim 1, wherein the shaft comprises a step at which the diameter of the shaft increases, the step preventing lateral movement of the plurality of sheave subassemblies on the shaft.

6. The elevator sheave assembly of claim 1, wherein the two bearings of each of the sheave subassemblies are roller bearings or ball bearings having an inner race connected to the shaft and an outer race connected to the sheave.

7. The elevator sheave assembly of claim 6, wherein the bearing spacer abuts and separates adjacent inner races of the bearings of the adjacent sheave subassemblies.

8. The elevator sheave assembly of claim 1, wherein the two bearings of each of the sheave subassemblies are bushings.

9. The elevator sheave assembly of claim 8, wherein the bearing spacer abuts and separates adjacent bushings of the adjacent sheave subassemblies.

10. The elevator sheave assembly of claim 1, wherein at least one of the plurality of sheave subassemblies is removable from the shaft without removal of the remaining plurality of sheave subassemblies.

11. The elevator sheave assembly of claim 1, wherein the running surface of the sheave of each of the plurality of sheave subassemblies is crowned for frictional tractive engagement with a flat belt tension member.

12. The elevator sheave assembly of claim 1, wherein the running surface of the sheave of each of the plurality of sheave subassemblies comprises one or more V-shaped grooves for frictional tractive engagement with a V-belt tension member.

13. The elevator sheave assembly of claim 1, wherein the running surface of the sheave of each of the plurality of sheave subassemblies is concave for frictional tractive engagement with a wire rope tension member.

14. An elevator system, comprising:
an elevator shaft having a support frame,
an elevator car movable along a vertical travel path defined by the elevator shaft;
a motor arrangement comprising at least one drive sheave rotatable via the motor arrangement;
at least one elevator sheave assembly connected to one of the elevator car and the support frame, the at least one elevator sheave assembly comprising:
  a shaft having a longitudinal axis; and
  a plurality of sheave subassemblies independently rotatable about the longitudinal axis of the shaft, each of the plurality of sheave subassemblies comprising:
    a sheave having a running surface; and
    two bearings arranged at opposing outer faces of the sheave and spaced apart from one another for rotatably connecting the sheave to the shaft;
  a bearing spacer arranged between adjacent sheave subassemblies of the plurality of sheave subassemblies on the shaft to isolate rotation of the adjacent sheave subassemblies relative to one another; and
a plurality of tension members each in frictional tractive engagement with at least one drive sheave of the motor arrangement and the sheave of one of the plurality of sheave subassemblies of the at least one elevator sheave assembly,
wherein each of the plurality of sheave subassemblies is independently rotatable relative to the other sheave subassemblies,
wherein the at least one elevator sheave assembly permits each tension member engaged with the at least one elevator sheave assembly to move at a different speed relative to the other tension members associated with the at least one elevator sheave assembly,
wherein the sheave of each of the plurality of sheave subassemblies defines a bore extending longitudinally through the sheave and housing the two bearings,
wherein the bore of each sheave comprises two shoulders, each shoulder configured to receive one of the bearings,
wherein the two shoulders are recessed inward from the opposing outer faces of the sheave, and
wherein the two shoulders are spaced apart from one another.

15. The elevator system of claim 14, wherein an outer face of each bearing of each sheave subassembly of the at least one elevator sheave assembly is aligned flush with an outer face of the sheave of that sheave subassembly.

16. The elevator system of claim 14, wherein the two bearings of each of the sheave subassemblies of the at least one elevator sheave assembly are roller bearings or ball bearings having an inner race connected to the shaft and an outer race connected to the sheave.

17. The elevator system of claim 14, wherein the two bearings of each of the sheave subassemblies of the at least one elevator sheave assembly are bushings.

18. The elevator system of claim 14, wherein at least one of the plurality of sheave subassemblies of the elevator sheave assembly is removable from the shaft without removal of the remaining plurality of sheave subassemblies.

\* \* \* \* \*